United States Patent
Jung et al.

(10) Patent No.: US 10,103,778 B2
(45) Date of Patent: Oct. 16, 2018

(54) METHOD FOR LINE CONTROL OF ACCESS NETWORK APPLIED G.HN TECHNOLOGY THERETO, ACCESS NETWORK MULTIPLEXER, ACCESS NETWORK TERMINAL, AND ACCESS NETWORK SYSTEM USING THE SAME

(71) Applicant: UBIQUOSS INC., Seongnam-si, Gyeonggi-do (KR)

(72) Inventors: Byung Gil Jung, Seoul (KR); Young Jib Kim, Seoul (KR)

(73) Assignee: UBIQUOSS INC. (KR)

( * ) Notice: Subject to any disclaimer, the term of this patent is extended or adjusted under 35 U.S.C. 154(b) by 0 days.

(21) Appl. No.: 15/301,386

(22) PCT Filed: Mar. 26, 2015

(86) PCT No.: PCT/KR2015/002973
§ 371 (c)(1),
(2) Date: Oct. 1, 2016

(87) PCT Pub. No.: WO2015/152570
PCT Pub. Date: Oct. 8, 2015

(65) Prior Publication Data
US 2017/0026080 A1    Jan. 26, 2017

(30) Foreign Application Priority Data

Apr. 1, 2014  (KR) .................. 10-2014-0038628
Apr. 1, 2014  (KR) .................. 10-2014-0038629
(Continued)

(51) Int. Cl.
*H04B 3/32*    (2006.01)
*H04L 12/28*   (2006.01)
(Continued)

(52) U.S. Cl.
CPC .............. *H04B 3/32* (2013.01); *H04B 3/54* (2013.01); *H04L 5/16* (2013.01); *H04L 12/2801* (2013.01);
(Continued)

(58) Field of Classification Search
None
See application file for complete search history.

(56) References Cited

U.S. PATENT DOCUMENTS 6,697,487 B1 *  2/2004  Getchell .................. H04B 3/06
                                              370/278
9,866,271 B2 *  1/2018  Park ......................... H04B 3/32
(Continued)

FOREIGN PATENT DOCUMENTS

JP  2011193360 A   9/2011
KR  100799587 B1   1/2008
(Continued)

OTHER PUBLICATIONS fastnetnews.com, "G.Fast DSL Has Momentum But G.Hn Networking Wants Some Action", (http://fastnetnews.com/dslprime/42-d/5048-gfast-dsl-has-momentum-but-ghn-wants-some-action), Feb. 24, 2014, 4 pages.
(Continued)

*Primary Examiner* — Gregory B Sefcheck
*Assistant Examiner* — Jenkey Van
(74) *Attorney, Agent, or Firm* — Renaissance IP Law Group LLP

(57) ABSTRACT

The present invention relates to a method for line control of access network applied G.hn technology thereto, and access network multiplexer (GAM), access network terminal (GNT), and access network system using the method, which includes a domain master as a collection of G.hn nodes communicating with the end-point of the access network, a
(Continued)

switch connecting the physical layer of G.hn specification with the multiple domain masters, and a controller controlling at least one of bandwidth, output, and signal to noise ratio (SNR) offset of the signal transmitted by at least one of the domain master and the end-point.

6 Claims, 11 Drawing Sheets

(30) Foreign Application Priority Data

| Apr. 1, 2014 | (KR) | 10-2014-0038631 |
|---|---|---|
| Apr. 1, 2014 | (KR) | 10-2014-0038632 |
| Mar. 9, 2015 | (KR) | 10-2015-0032685 |

(51) Int. Cl.

| H04M 11/06 | (2006.01) |
|---|---|
| H04L 5/16 | (2006.01) |
| H04L 12/24 | (2006.01) |
| H04B 3/54 | (2006.01) |
| H04L 12/64 | (2006.01) |
| H04L 12/801 | (2013.01) |

(52) U.S. Cl.
CPC ........ *H04L 12/287* (2013.01); *H04L 12/2834* (2013.01); *H04L 12/2894* (2013.01); *H04L 12/6418* (2013.01); *H04L 41/0672* (2013.01); *H04M 11/062* (2013.01); *H04B 2203/5425* (2013.01); *H04L 47/10* (2013.01)

(56) References Cited

U.S. PATENT DOCUMENTS

| 2010/0150556 | A1 | 6/2010 | Soto et al. | |
|---|---|---|---|---|
| 2011/0129036 | A1* | 6/2011 | Okuhata | H04L 27/1525 375/316 |
| 2013/0176848 | A1* | 7/2013 | Jinzaki | H04L 47/193 370/230.1 |
| 2014/0355518 | A1* | 12/2014 | Brown | H04W 88/16 370/328 |

FOREIGN PATENT DOCUMENTS

| KR | 20080000090 A | 1/2008 |
|---|---|---|
| KR | 20110056048 A | 5/2011 |
| KR | 101234102 B1 | 2/2013 |
| KR | 20130069815 A | 6/2013 |
| KR | 20130127399 A | 11/2013 |

OTHER PUBLICATIONS

International Search Report and Written Opinion for PCT/KR2015/002973 dated Jul. 13, 2015, 14 pages.

International Telecommunication Union, Telecommunication Standardization Sector of ITU, ITU-T G.9960, "Series G: Transmission Systems and Media, Digital Systems and Networks—Unified high-speed wire-line based home networking transceivers—System architecture and physical layer specification," Jan. 2014, 16 pages.

International Telecommunication Union, Telecommunication Standardization Sector of ITU, ITU-T G.9960, "Series G: Transmission Systems and Media, Digital Systems and Networks—Unified high-speed wireline-based home networking transceivers—System architecture and physical layer specification," Jul. 2015, 162 pages.

* cited by examiner

Before line control

| Lines | SLA | Distance | CPE's Tx Power(dB) | CPE's SNR Offset(dB) | FECR of Upstream | Performance & Stability |
|---|---|---|---|---|---|---|
| 1 | Low | Several tens meters(<50m) | 2 | 0 | 16/18 | Good |
| 2 | Low | Several tens meters(<100m) | 2 | 0 | 16/18 | Good |
| 3 | Medium | Several hundreds meters(<100m) | 2 | 0 | 5/6 | Bad |
| 4 | High | Several hundreds meters(>300m) | 2 | 0 | 2/3 | Bad |

After line control

| Lines | SLA | Distance | CPE's Tx Power(dB) | CPE's SNR Offset(dB) | FECR of Upstream | Performance & Stability |
|---|---|---|---|---|---|---|
| 1 | Low | Several tens meters(<50m) | 1 | 0 | 16/18 | Good |
| 2 | Low | Several tens meters(<100m) | 1 | 0 | 5/6 | Good |
| 3 | Medium | Several hundreds meters(<100m) | 3 | 1.5 | 16/18 | Good |
| 4 | High | Several hundreds meters(>300m) | 4 | 1.5 | 5/6 | Good |

FIG. 10

Before line control

| Lines | SLA | Distance | CO's Tx Power(dB) | CO's SNR Offset(dB) | FECR of Downstream | Performance & Stability |
|---|---|---|---|---|---|---|
| 1 | Low | Several tens meters(<50m) | 2 | 0 | 16/18 | Good |
| 2 | Low | Several tens meters(<100m) | 2 | 0 | 16/18 | Good |
| 3 | Medium | Several hundreds meters(<200m) | 2 | 0 | 5/6 | Bad |
| 4 | High | Several hundreds meters(>300m) | 2 | 0 | 2/3 | Bad |

After line control

| Lines | SLA | Distance | CO's Tx Power(dB) | CO's SNR Offset(dB) | FECR of Downstream | Performance & Stability |
|---|---|---|---|---|---|---|
| 1 | Low | Several tens meters(<50m) | 1 | 0 | 16/18 | Good |
| 2 | Low | Several tens meters(<100m) | 1 | 0 | 5/6 | Good |
| 3 | Medium | Several hundreds meters(<200m) | 3 | 1.5 | 16/18 | Good |
| 4 | High | Several hundreds meters(>300m) | 4 | 1.5 | 5/6 | Good |

FIG. 11

METHOD FOR LINE CONTROL OF ACCESS NETWORK APPLIED G.HN TECHNOLOGY THERETO, ACCESS NETWORK MULTIPLEXER, ACCESS NETWORK TERMINAL, AND ACCESS NETWORK SYSTEM USING THE SAME

BACKGROUND

The present invention relates to relates to a method for line control of an access network applied G.hn technology thereto and access network multiplexer (also called as G.hn access multiplexer (GAM) or access multiplexer hereinafter), access network terminal(also called as a G.hn access terminal (GNT) or terminal hereinafter), and an access network system using the method, more specifically, which controls line rate and output according to the desired bandwidth for each subscriber and varying line condition in real time and employs G.hn technology reducing crosstalk in a bundle cable.

G.hn is described in ITU-G.9960 specification which deals with transmitter and receiver configurations and the physical layer for wired home network. Referring to FIG. 1, the communication among domains in a home network based on the ITU-T G.hn specifications is performed with the domain master. The domain master allocates and controls resources (e.g. bandwidth, priority, etc.) of all the nodes belonging to the domain. The domain master can have node registration process storing and administering MAC addresses; authentication and control function for joining a node; and monitoring function for observing the entire node in the domain. Additionally, the node belonging to the domain supports registration authentication control protocol and performs receiving and other operations according to the medium access plan (MAP).

In addition, the G.hn utilizes a single pair of power line, coaxial cable, unshielded twisted pair (UTP) line, or phone line but in the access network it consists of more than one pair of bundles. Hence, by applying the G.hn (ITU-T 9960, 9961) for home networking to the access network utilizing conventional cable or phone line, the maximum bandwidth of the network can be increased up to 1 Gbps.

Therefore, when the G.hn technology is applied to the access network, a concentration equipment (Central Office, CO) and a terminal (Customer Premises Equipment, CPE) are connected with a bundle cable; in this case the crosstalk occurred at the bundle cable can disturb the communications. Additionally, since the G.hn is based on half duplex or best-effort mechanisms and unable to adjust the bandwidth for each port, it is required to set up the bandwidth for each port to apply service level agreement (SLA) in the access network employing the G.hn technology.

SUMMARY

The objective of the present invention is to provide a line control method of an access network, which controls line rate and output according to the desired bandwidth for each subscriber and varying line condition in real time and employs G.hn technology reducing crosstalk in a bundle cable, and G.hn access multiplexer (GAM), an access network terminal (GNT), and an access network system using the method.

Based on the feature of the present invention to achieve the objectives described as above, the G.hn access multiplexer employing the G.hn specification comprises a domain master which is a collection of G.hn nodes and communicates with end-points in the access network; a switch that connects the physical layer of G.hn specification with the multiple domain masters; and a controller controlling at least one of bandwidth, output, or signal-to-noise ratio offset of the signal that at least one of the domain master and the end-point transmits.

Wherein, the controller efficiently manipulates the traffic in the same bundle cable by adjusting the output power of each port according to the actual used traffic volume in such a way that the output of a port having no traffic or significantly less traffic volume than other ports is lowered and the output of a port having large traffic volume or significantly more traffic volume than other ports is increased.

According to another feature of the present invention, the terminal in an access network employing the G.hn specification of the present invention communicates with a domain master as a collection of G.hn nodes and the controller in the G.hn access multiplexer controls at least one of bandwidth, actual traffic volume, output, and signal to noise ratio (SNR) offset of the transmitted signal.

According to another feature of the present invention, the access network system employing G.hn specification of the present invention includes multiple domain masters multiple domain masters communicating with the access network terminal and the controller controlling at least one of bandwidth, output, and signal to noise ratio (SNR) offset of the signal transmitted by the domain master; the G.hn access multiplexer connecting the domain master with the physical layer employing the G.hn specification; and the access network terminal that communicates with the domain master and at least one of speed or output of the signal of the terminal is controlled by the controller.

According to another feature of the present invention, the line control method of an access network employing G.hn technology includes a phase in which the controller in the G.hn access multiplexer receives the bandwidth of the terminal more than one subscriber sets up; a phase in which each domain master in the G.hn access multiplexer detects the line parameter for the terminal; and a phase in which the controller controls at least one of the signal transmitted by the domain master or the terminal according to the line parameter.

According to another feature of the present invention, the line control method of an access network employing G.hn technology includes a phase in which a terminal detects the gain of actual received signal for at least one of subscribers and the target forward error correction rate; and a phase in which the controller in the G.hn access multiplexer controls at least one of output and signal to noise ratio (SNR) offset of the signal transmitted by at least one of the domain master and the terminal based on the gain of actual received signal for the subscriber and the target forward error correction rate.

According to another feature of the present invention, the line control method of an access network employing G.hn technology includes a phase the transmission power is set to the base value "x" for all the subscribers; a phase detecting the used traffic volume for each subscriber; a phase determining whether the traffic volume for the subscriber is increasing when the traffic volume is rapidly increased; a phase in which the output power for the subscriber is lowered and appropriate adjustment for the other subscribers is made in case the traffic volume for the subscriber is increasing; and a phase in which the output power for the subscriber is increased and appropriate adjustment for the other subscribers is made in case that the traffic volume for the subscriber is increasing.

According to another feature of the present invention at the same time, the line control method of an access network employing G.hn technology includes a phase in which the upload and download traffic volume for each subscriber is measured periodically; and a phase in which the controller in the G.hn access multiplexer controls at least one of bandwidth, actual traffic volume, output, and signal to noise ratio (SNR) offset of the signal transmitted by at least one of the domain master in the G.hn access multiplexer or the terminal according to the actual traffic volume for the subscriber.

According to another feature of the present invention at the same time, the line control method of an access network employing G.hn technology is a method applying the G.hn technology to an access network consisting of more than one G.hn access multiplexer having multiple ports and multiple subscriber terminals; it includes a phase in which target bandwidth is set up for the terminal, a phase in which the node in the G.hn access multiplexer monitors in real-time the parameter of the line connected physically with the terminal, a phase in which the measured bandwidth based on the line parameter and the target bandwidth established by the terminal are compared, and a phase in which the actual line rate is adjusted according to the target bandwidth; at the step for controlling the line rate of the terminal, a specific frequency notch filtering is applied when the actual speed of the terminal is higher than the target bandwidth and a specific frequency notch filtering is disabled when the actual speed of the terminal is lower than the target bandwidth.

According to the present invention, the G.hn technology can be applied to the access network using the conventional copper cable or phone line so as to provide efficient data transmission with higher bandwidth to service subscribers, to provide service level agreement (SLA) by setting up the bandwidth for each port and controlling transmission speed, and to reduce crosstalk in data transmission.

BRIEF DESCRIPTION OF THE DRAWINGS

For more complete understanding of this disclosure, reference is now made to the following brief description, taken in connection with the accompanying drawings and detailed description.

FIG. 10 shows a diagram for illustrating the line condition in upload traffic before and after applying the line rate control method in accordance with an embodiment of the present invention.

FIG. 11 shows a diagram for illustrating the line condition in download traffic before and after applying the line rate control method in accordance with an embodiment of the present invention.

DETAILED DESCRIPTION

Hereinafter, the line control method of an access network employing G.hn technology and G.hn access multiplexer (GAM), an access network terminal (GNT), and an access network system using the method in accordance with the present invention are explained in detail with reference to the accompanying figures. Line widths of figures or sizes of constituent components in the figures may be excessively exaggerated for the purpose of clear explanation and convenience. In addition, the terms described below are defined considering the functionalities in the present invention so that they are differently used depending upon the intention of user or operator or the convention. Therefore, the definitions for those terms are used considering the entire content of this specification.

The line control method in an access network and the system therefore in the present invention can be implemented in the access network environments employing G.hn specification in which G.hn access multiplexer (GAM), in which multiple ports perform the function of a domain master, and multiple terminals (GNTs), which perform the function of an end-point (EP) forming a G.hn domain, are connected through a bundle cable.

Figure 2:
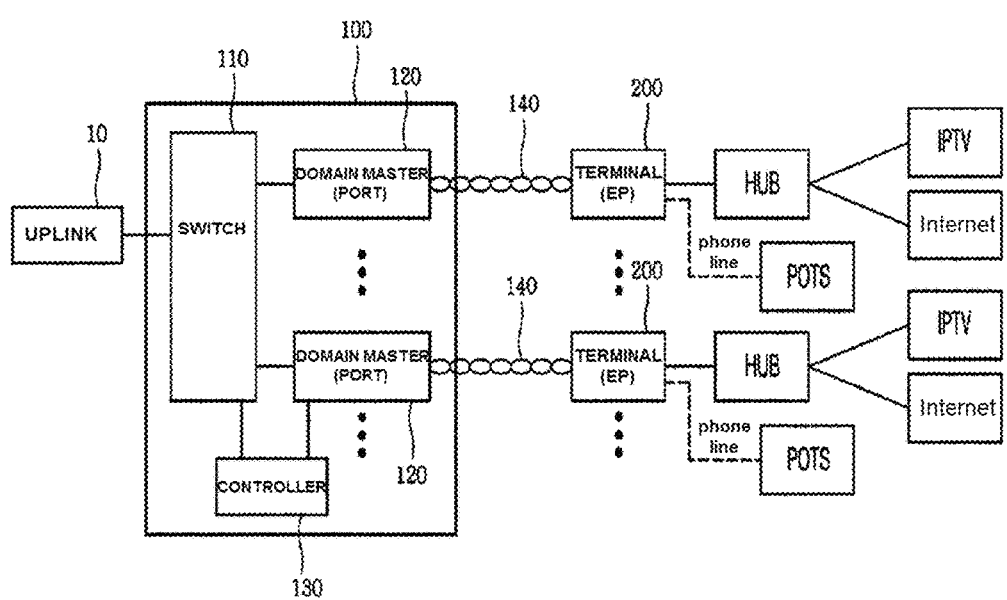
FIG. 2 shows a block diagram for the access network employing the G.hn specification in accordance with an embodiment of the present invention.

FIG. 2 is a block diagram for the access network employing the G.hn specification in accordance with an embodiment of the present invention. The access network can be an optical access network or a telephone line based DSL (Digital Subscriber Line) access network according to the communication medium. In FIG. 2, a telephone line based DSL access network is shown as an embodiment of the present invention.

As shown in FIG. 2, the access network employing the G.hn specification in accordance with an embodiment of the present invention includes a G.hn access multiplexer (GAM or concentration equipment) 100 in which multiple ports are functioning as domain masters, a G.hn network terminal (GNT or terminal) 200 replaced by the end-point employing G.hn specification, and a bundle cable 140 connecting the domain master and the end-point by a phone line.

The G.hn access multiplexer (GAM) 100 comprises a domain master 120 that is a collection of G.hn nodes communicating with the terminal (GNT) 200; a switch 110 that connects multiple domain masters 120 and physical layers employing G.hn; and a controller 130 that controls at least one of speed or output of the signal transmitted by the domain master.

The terminal (GNT) 200 is connected to the domain master 120 which is a collection of G.hn nodes contained in the G.hn access multiplexer (GAM) 100 with a bundle; communicates synchronized at the pre-determined frequency less than 10 kHz; is replaced by the end-point employing G.hn specification; and at least one of the speed and output of the signal it sends can be controlled by the controller 130 of the G.hn access multiplexer (GAM) 100.

Meanwhile, the G.hn access multiplexer (GAM) 100 is located at the network operator's side and the terminal (GNT) 200, physically connected to the G.hn access multiplexer (GAM) 100 as a terminal device of it, can be located at a user's or a service subscriber's side. For example, the G.hn access multiplexer (GAM) 100 is connected with the terminal (GNT) 200 via a phone line. The G.hn access multiplexer (GAM) 100 is connected to an uplink 10 and comprises a switch 110 and multiple ports. The uplink 10 is connected with the communication devices in the upper layer and the multiple ports are connected with a terminal (GNT) 200 respectively via a phone line, CPEV, F/S. TIV, UTP, or etc.

Meanwhile, in order to apply G.hn technology to the access network consisting of the G.hn access multiplexer (GAM) 100 and the terminal (GNT) 200, each port is replaced by the domain master 120 to perform the role of domain master employing G.hn specification, and each terminal (GNT) 200 can be replaced by the end-point (EP) to perform the role of end-point employing G.hn specification. Hence, a G.hn domain on the network consisting of a domain master 120 and terminals (GNT) 200 replaced by multiple end-points connected with the domain master can be formed.

Here, the range of bit rate for the conventional DSL service subscriber is normally between 250 Kbit/sec and 100 Mbit/sec, and, more specifically, determined according to Table 1.

TABLE 1

| DSL Service Type | Adopted Technology | Bitrates |
|---|---|---|
| ADSL (G.lite) | ITU-T G.992.2 | up to 1,536 Kbit/s and 512 Kbit/s |
| ADSL2 | ITU-T G.992.3 | up to 12 Mbit/s and 3.5 Mbit/s |
| ADSL2+ | ITU-T G.992.5 | up to 24 Mbit/s and 3.5 Mbit/s |
| VDSL | ITU-T G.993.1 | up to 52 Mbit/s and 16 Mbit/s |
| VDSL2 | ITU-T G.993.2 | up to 200 Mbit/s |

Figure 3:
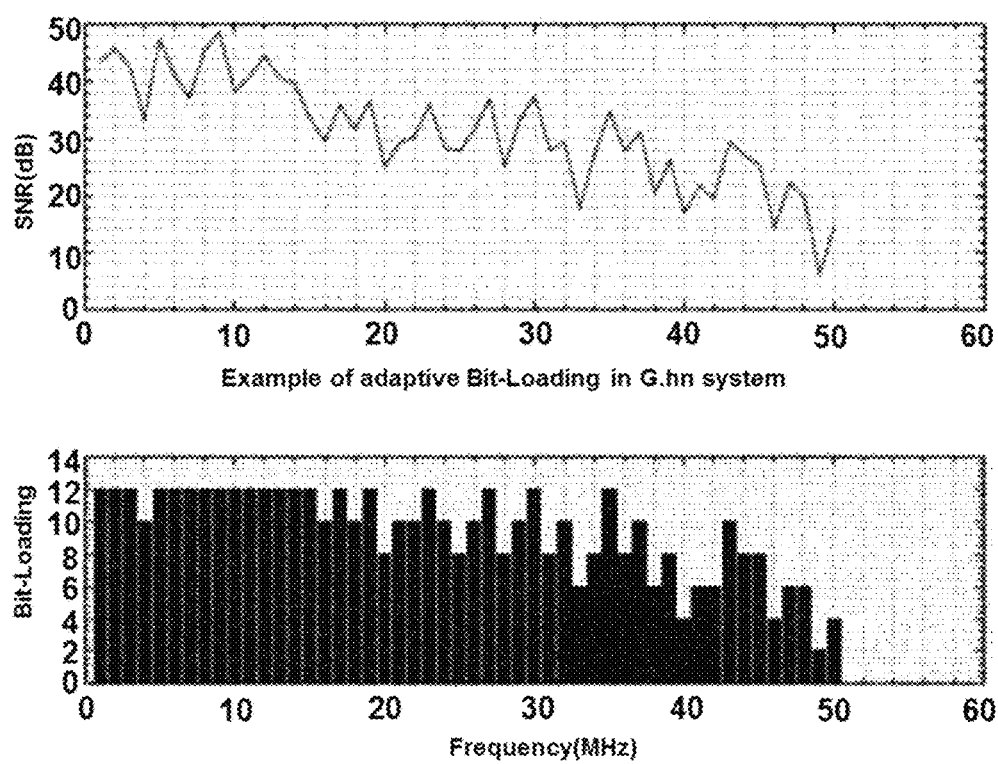
FIG. 3 shows a graph illustrating signal to noise ratio (SNR) for the frequency band from 0 to 100 MHz in accordance with an embodiment of the present invention.

FIG. 3 is a graph illustrating signal to noise ratio (SNR) for the frequency band from 0 to 100 MHz in accordance with an embodiment of the present invention. Referring to FIG. 3, the SNR value is decreasing as the frequency increases and the communication channel is stable at the low frequency band but it becomes unstable at the high frequency band. The maximum symbol bit-loading of a carrier is 12 bit, and whereas high bit-load value is maintained in the low frequency band, low bit-load value is maintained in the high frequency band. Therefore, the communication channel is more stable in the low frequency range.

Meanwhile, the controller 130 reduces bandwidth by applying a notch filter at a specific frequency band to the signal a domain master 120 sends if the actual speed of the signal the domain master sends is higher than the target bandwidth a subscriber sets up and in this case the controller 130 calculates the actual speed of the signal the domain master 120 sends based on the line parameter including at least one of line rate, frequency characteristics, interference, or packet error. In other words, the controller 130 sets up the bandwidth of a terminal at the subscriber side according to the service level agreement provided by the service provider.

In addition, the domain master 120 detects the actual values of line parameters at a subscriber line such as line rate, actual traffic volume, frequency characteristics, interference, packet error, or etc. At this time such line parameters can be collected at the domain master 120 side or they can be collected at the terminal (GNT) 200 side and then sent to the domain master 120. Furthermore, if the actual speed of a subscriber is higher than the target bandwidth or the actual traffic volume is low or significantly less than that of other subscribers, the controller 130 adjusts the line rate according to the target bandwidth by applying a notch filter to the frequency band having high SNR values, i.e. relatively stable frequency band or lowering transmission power so as to reduce the actual line speed; and if the actual speed of a subscriber is lower than the target bandwidth or the actual traffic volume is high or significantly more than that of other subscribers, the controller 130 adjusts the line rate according to the target bandwidth by disabling a notch filter or increasing transmission power so as to increase the actual line rate.

Figure 4:
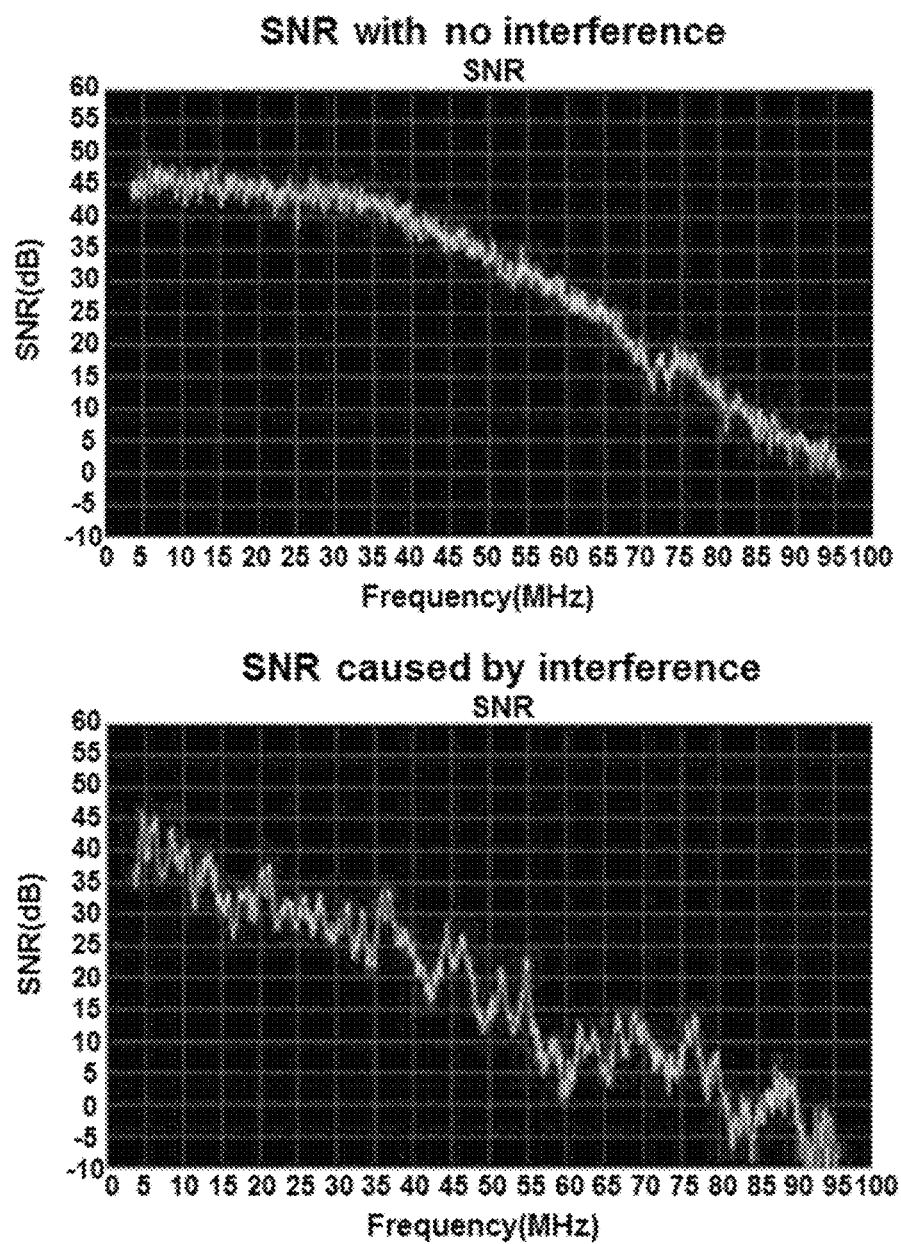
FIG. 4 shows a graph illustrating SNR caused by interference of a G.hn line connected with CPEV having a length of 100 m in accordance with an embodiment of the present invention.

FIG. 4 is a graph illustrating SNR caused by interference of a G.hn line connected with CPEV having a length of 100 m in accordance with an embodiment of the present invention. As shown in FIG. 4, the SNR with no interference is maximum 50 dB, minimum 0 dB, and average 25 dB whereas the SNR with interference is maximum 45 dB, minimum −10 dB, and average 17.5 dB; thus, if the interference occurs, SNR is deteriorated and distortion occurs in all frequency bands.

Figure 1:
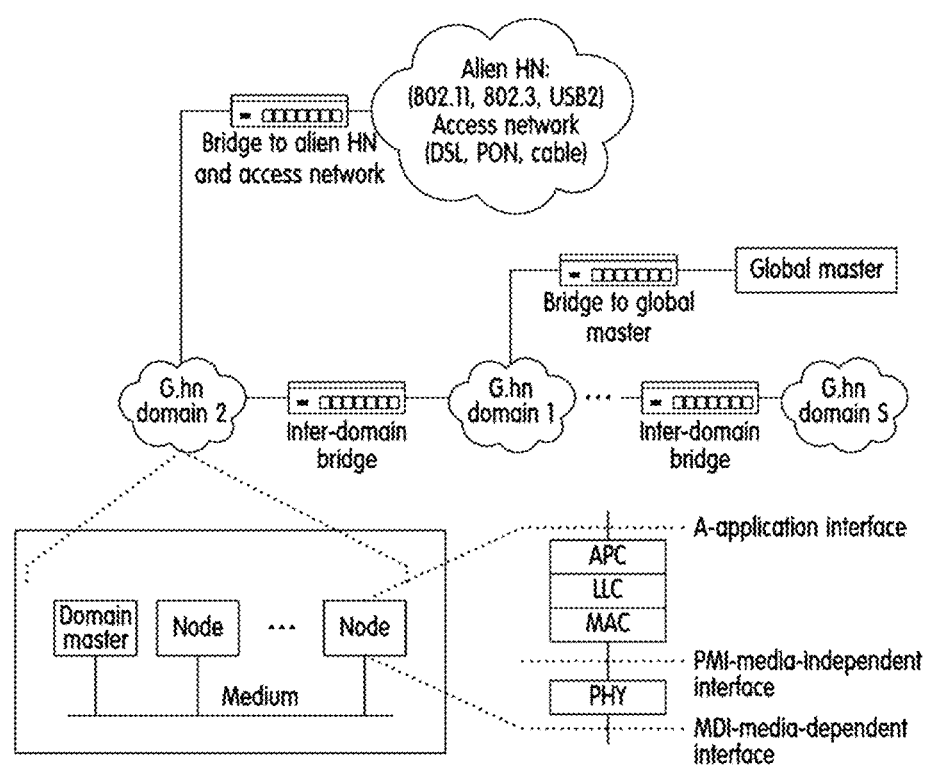
FIG. 1 shows a conceptual diagram for displaying the configuration of a general G.hn specification.

As described above, since each of multiple domain masters 120 replacing each port and the terminal (GNT) 200 are connected with a bundle cable in connecting the G.hn access multiplexer (GAM) 100 and the terminal (GNT) 200, communication failure can happen to the crosstalk in a bundle cable. In particular, in case the access network is connected through the phone line as shown in FIG. 1, the communication between the G.hn access multiplexer (GAM) 100 and the terminal (GNT) 200 is sensitive to interference such as FoamSkin, CPEV, TIV, PVC, and etc. and the interference between lines can worsen in the high frequency band (2~100 MHz) that G.hn uses. Furthermore, because the line signal of other terminals (GNT) 200 is diminished or distorted due to the interference occurring when a terminal is powered up (Power Up), a link is established (Link Up), or data is transmitted or received, the configuration of line needs to be changed in real-time according to the situations in which the interference is occurred.

Accordingly, the controller 130 increases the output power (Tx Power) and the signal to noise ratio (SNR) offset of the signal the domain master 120 sends if the actual received signal gain (Rx Gain) of the download traffic is larger than the pre-set target received signal gain of a subscriber, the pre-set target forward error correction rate (FECR) is larger than the actual forward error correction rate of a subscriber, or the download traffic for the corresponding subscriber is large or significantly larger than that of other subscribers; it decreases the output power and the signal to noise ratio (SNR) offset of the signal the domain master 120 sends if the actual received signal gain (Rx Gain) of the download traffic is less than or equal to the pre-set target received signal gain of a subscriber, the pre-set target forward error correction rate (FECR) is less than or equal to the actual forward error correction rate of a subscriber, or the download traffic for the corresponding subscriber does not exist or is significantly less than that of other subscribers.

Furthermore, the controller 130 increases the output power (Tx Power) and the signal to noise ratio (SNR) offset of the signal the terminal (GNT) 200 sends if the actual received signal gain (Rx Gain) of the upload traffic is larger than the pre-set target received signal gain of a subscriber, the pre-set target forward error correction rate (FECR) is larger than the actual forward error correction rate of a subscriber, or the upload traffic for the corresponding subscriber is large or significantly larger than that of other subscribers; it decreases the output power and the signal to noise ratio (SNR) offset of the signal the terminal (GNT) 200 sends if the actual received signal gain (Rx Gain) of the upload traffic is less than or equal to the pre-set target received signal gain of a subscriber, the pre-set target forward error correction rate (FECR) is less than or equal to the actual forward error correction rate of a subscriber, or the upload traffic for the corresponding subscriber does not exist or is significantly less than that of other subscribers.

In other words, the received signal gain, FECR, and the actual transmission rate are changed according to the length of cable or line and the transmission power, and the transmission power and the SNR offset are changed by analyzing in real time the received signal gain, FECR, SNR, and the actual traffic volume considering the characteristics of a cable and the number of ports in a bundle cable.

At the same time, each terminal (GNT) 200 detects periodically actual transmission rate, actual traffic volume, received signal gain, FECR, and SNR of the download traffic and each domain master 120 detects periodically actual transmission rate, actual traffic volume, received signal gain, FECR, and SNR of the upload traffic; the collected information is transferred to the domain master 120 and used by the controller 130 to control the parameters of each line as described before.

Figure 5:
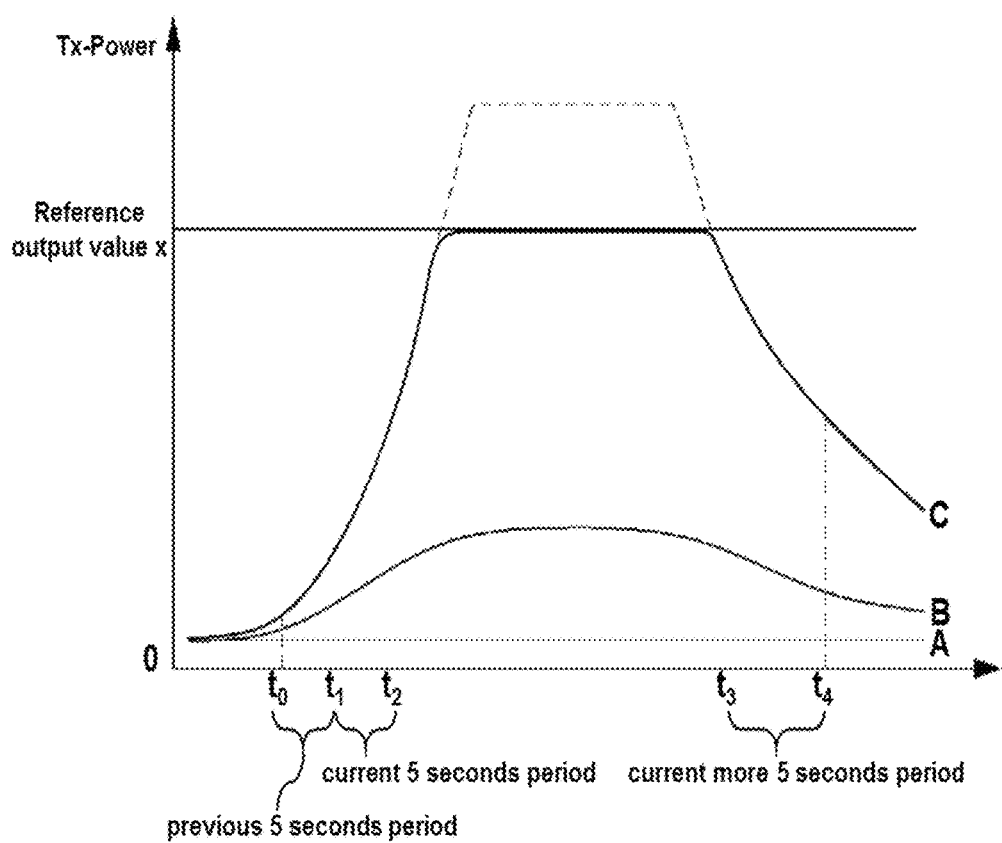
FIG. 5 shows a graph illustrating service differentiation based on the actual traffic volume for each subscriber in accordance with an embodiment of the present invention.

FIG. 5 is a graph illustrating service differentiation based on the actual traffic volume for each subscriber in accordance with an embodiment of the present invention. Referring to FIG. 5, the performance is quite different depending on the adjacent port or the number of active ports in a bundle cable due to the G.hn characteristics. For example, if the number of active ports in a bundle cable increases so that the performance is deteriorated, the active output power is far below the ordinary reference value, "x." In addition, the total traffic of all the links connected with a bundle cable does not maintain a maximum value, and a subscriber connects to a link randomly so that the total traffic of all subscribers fluctuates. Therefore, since the traffic volume for each active port varies in real time, the service to subscribers needs to be differentiated according to the subscriber condition by flexibly adjusting traffic resource.

For example, in case the download transmission power (Tx Power) is set to the reference output value "x" for all the active ports, the traffic volume for each subscriber (subscriber A and B) does not change a lot whereas the traffic volume can increase significantly (subscriber C). Therefore, considering the traffic volume of the subscribers, the output power can be changed to above "x" or below "x" to provide differentiated service to subscribers instead of constantly maintaining the transmission power (Tx Power) at the reference output value (x) regardless of the actual usage of each subscriber.

In this case, the download transmission power (Tx Power) can be controlled by periodically monitoring the change of download traffic of each subscriber port. All ports are monitored by measuring the traffic download rate of each port for every several seconds (e.g. 5 seconds). By comparing the traffic volume (Last Down Rate) measured in the previous 5 second period (t0~t1) and the traffic volume (Present Down Rate) measured in the current 5 second period (t1~t2), the traffic usage of a subscriber for each port can be measured.

If the present down rate for the present 5 second period is more than 7 Mbps (e.g. IPTV service is started) or the present down rate is increased by 50% or more compared with the last down rate (in case the traffic volume for speed measurement is rapidly increased), the transmission power (Tx Power) of the corresponding port needs to be increased.

Likewise link adaptation is performed for the active ports of other subscribers as the transmission power (Tx-Power) of the corresponding port is increased to "x+α" above the reference output value. In other words, the used traffic volume information for each port of subscribers is statistically monitored in real time (in this case the monitored state variation can be represented by log scale to test the corresponding function) so that the traffic usage volume for each subscriber is recognized; the transmission power (Tx-Power) of the subscriber having high traffic demand can be increased as much as needed by reallocating the transmission power and contrarily the transmission power of the subscriber having low traffic demand is decreased to perform link adaptation. In this way by optimizing the transmission power (Tx-Power) according to the usage status of subscribers, limited traffic resources can be used fully.

In addition, if the present down rate for the present 5 second period (t3~t4: as the transmission power can be temporarily decreased and increasing anytime, the period having statistics of decreasing transmission power happens more frequently than the period having statistics of increasing transmission power) is maintained less than 7 Mbps for more than several minutes (e.g. 5 minutes) (the current state is maintained at least 5 minutes required for STB button rebooting, PC restart, or retest of speed measurement) at the state of transmission power (Tx-Power) is "x+α," the transmission power (Tx-Power) of the corresponding port is reset to the reference output value "x" and likewise link adaptation is performed for the active ports of other subscribers to optimize the transmission power in the changed environments.

Therefore, if the transmission power of more than one of subscriber ports is not working, all the active ports of other subscribers perform link adaptation to reallocate the transmission power and improve traffic use efficiency.

Figure 6:
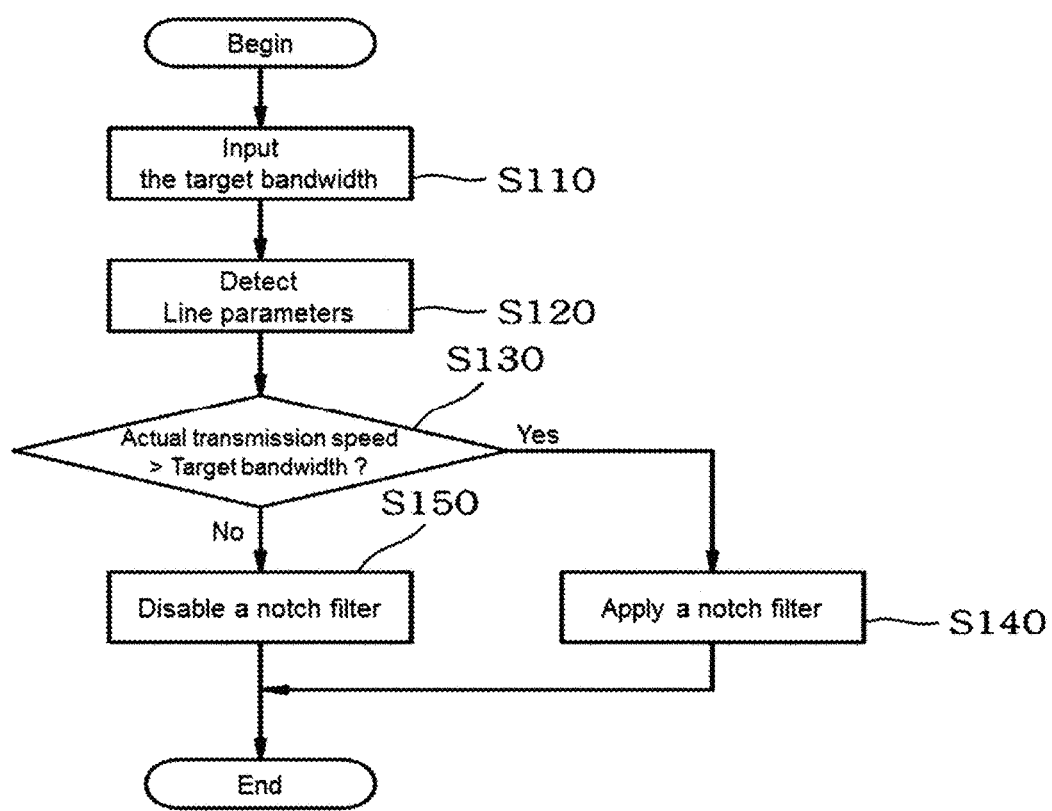
FIG. 6, FIG. 7, and FIG. 8 show flow charts for illustrating operations of the line control method in the access network employing G.hn specification in accordance with an embodiment of the present invention.

FIG. 6 is a flow chart for illustrating operations of the line control method in the access network employing G.hn specification in accordance with an embodiment of the present invention. Referring to FIG. 6, the line control method in the access network employing G.hn specification in accordance with an embodiment of the present invention is explained.

Firstly, the controller 130 in the G.hn access multiplexer (GAM) 100 receives the target bandwidth for the terminal (GNT) 200 at least one of subscribers set up (S110).

Next, each domain master 120 in the G.hn access multiplexer (GAM) 100 detects line parameters of the terminal (GNT) 200 (S120). At this time, the line parameter includes at least one of line rate, actual traffic volume, frequency characteristics, interference, or packet error. As described earlier, such line parameters can be collected at the domain master 120 side or they can be collected at the terminal (GNT) 200 side and then sent to the domain master 120. Furthermore, the controller calculates the actual speed of the signal the domain master 120 sends based on the line parameters.

Next, the controller 130 compares the actual speed of the signal the domain master 120 sends and the actual traffic volume with the target bandwidth of the terminal (GNT) 200 a subscriber sets up (S130).

Meanwhile, the controller 130 reduces bandwidth by applying a notch filter to the signal the domain master 120 sends or decreasing the transmission power if the actual speed of the signal the domain master sends is higher than the target bandwidth, or the actual traffic volume is low or significantly less than that of other subscribers (S140).

In addition, the controller 130 increases bandwidth by disabling a notch filter to the signal the domain master 120 sends if the actual speed is less than the target bandwidth or the actual traffic volume of the corresponding subscriber is significantly more than that of other subscribers (S150).

Through the steps from (S130) to (S150), the controller 130 controls the bandwidth of the signal the domain master 120 transmits based on the line parameters.

Figure 7:
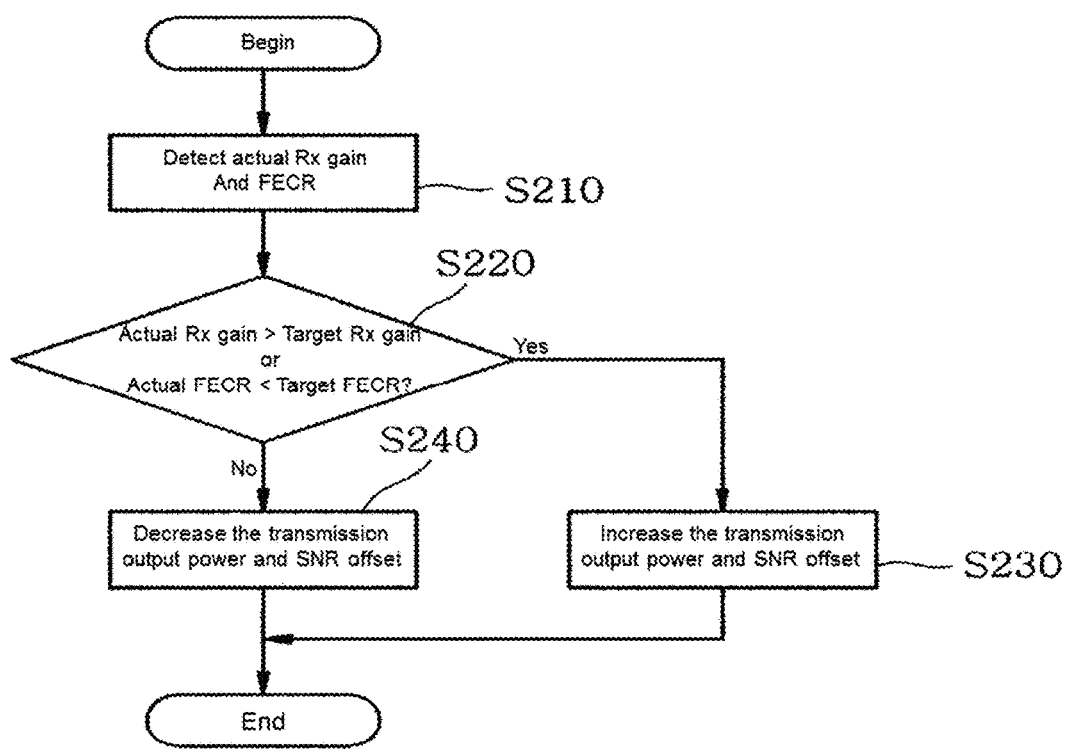

FIG. 7 is a flow chart for illustrating operations of the line control method in the access network employing G.hn specification in accordance with an embodiment of the present invention.

Firstly, the terminal (GNT) 200 detects the actual received signal gain and the forward error correction rate for the subscriber (S210).

Next, the controller 130 compares the actual received signal gain and the forward error correction rate for the subscriber (S220). At the same time, the controller 130 increases the output power and the signal to noise ratio offset of the signal the domain master 120 sends (S230) if the actual received signal gain is larger than the pre-set target received signal gain of the subscriber, or the pre-set target forward error correction rate is larger than the actual forward error correction rate of the subscriber and terminates the process. In addition, the controller 130 decreases the output power and the signal to noise ratio offset of the signal the domain master 120 sends (S240) if the actual received signal gain is less than or equal to the pre-set target received signal gain of the subscriber or the pre-set target forward error correction rate is less than or equal to the actual forward error correction rate of the subscriber and terminates the process.

Through the steps from (S220) to (S240), the controller 130 controls at least one of the output power and the signal to noise ratio offset of the signal which at least one of the domain master 120 in the G.hn access multiplexer (GAM) 100 and the terminal (GNT) 200 sends based on the actual received signal gain and the target forward error correction rate.

Figure 8:
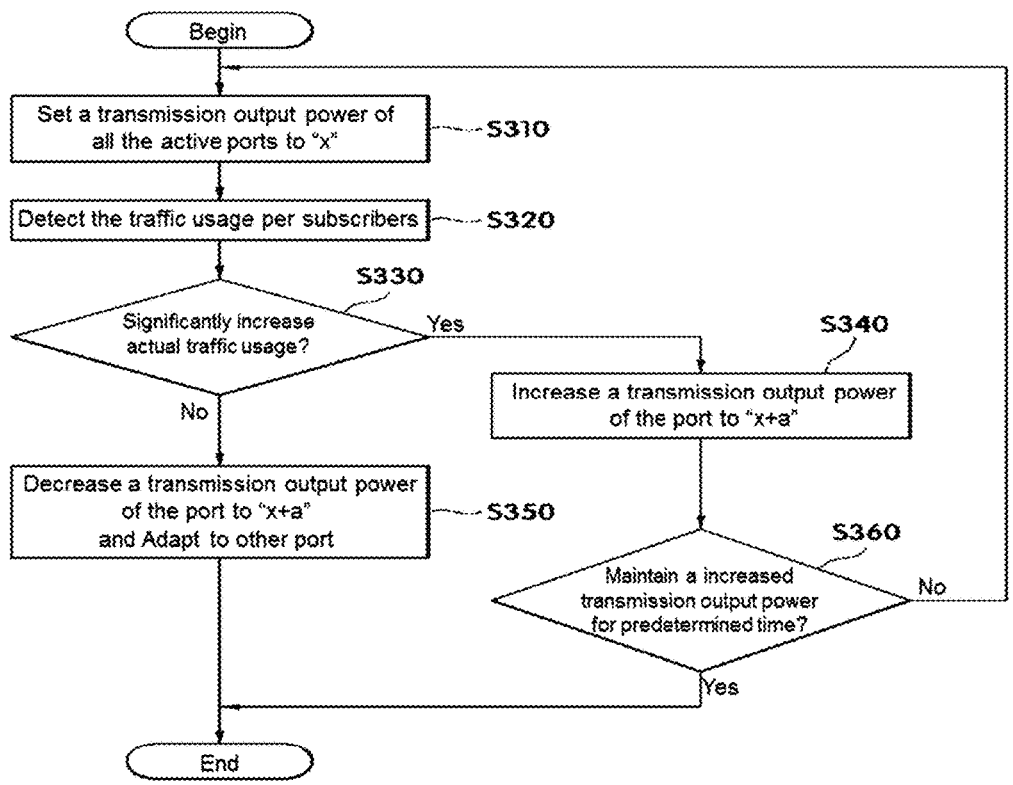

FIG. 8 is a flow chart for illustrating operations of the line control method in the access network employing G.hn specification in accordance with an embodiment of the present invention.

Firstly, the transmission power (Tx-Power) is set to the reference output value "x" (S310). Here, "x" is the average transmission power for all the active ports in a bundle cable. The "x" is decreased from the actual output value due to the crosstalk in the bundle cable. At the same time, the reference output value can be a default value and increased depending on the situation or contrarily it can be a maximum value and decreased depending on the traffic usage status.

The terminal (GNT) 200 detects the actual traffic usage volume (S320). In case of an office worker, the traffic usage is concentrated in nighttime since he connects to a network after leaving work and the traffic can be generated in daytime in case of a house keeper; and thus the traffic volume used is different to subscribers.

The controller 130 compares whether the actual traffic volume for the subscriber significantly increases (S330).

At this time, if the traffic volume used for a subscriber is significantly increasing, the transmission power of the corresponding subscriber is increased. Meanwhile, the transmission power of other subscribers is decreased by performing link adaptation as the transmission power of the corresponding subscriber is increased (S340). The traffic volume used is regarded as significantly increasing if the statistics for the present 5 second period is more than 7 Mbps (e.g. IPTV service is started) or the traffic volume for the present 5 second period is increased by 50% or more compared with the traffic volume for the last 5 second period.

On the contrary, if the traffic volume used for a subscriber is not increasing, the transmission power of the corresponding subscriber is decreased. Likewise, traffic resources are reallocated by performing link adaptation to the output power of other subscribers as the transmission power of the corresponding subscriber is decreased (S350). This case can happen if a PC is powered on but the traffic is not generated while the port for the subscriber is open or if a PC is powered off.

Since the transmission power is hardly maintained at the increased level, traffic usage status is periodically monitored. In case of the corresponding port having increased transmission power, if the statistics of the transmission power maintains less than 7 Mbps for several minutes (5 minutes) or if the traffic volume for the present 5 second period is decreased by 50% or more compared with the traffic volume for the last 5 second period, then the increased transmission power is not maintained and therefore the transmission power need to be reset to the reference output value "x" as in the initial access (S360).

Figure 9:
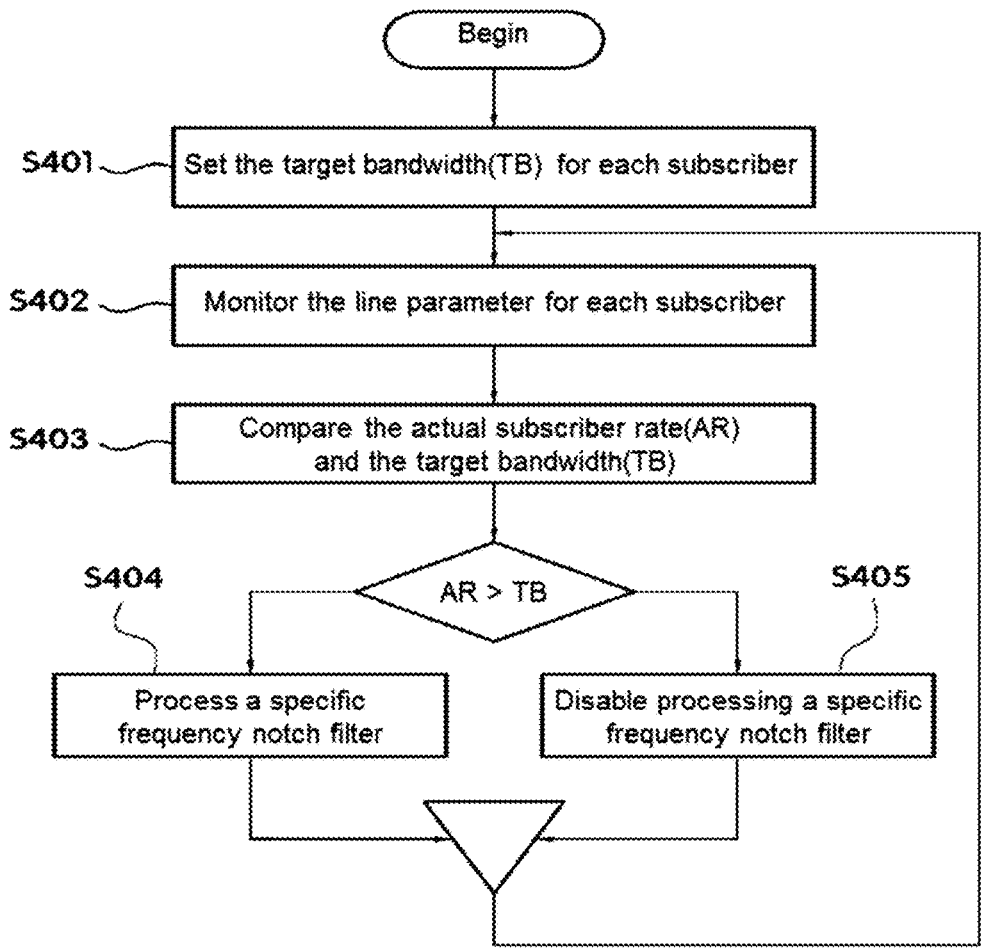
FIG. 9 shows a flow chart for illustrating the speed control method of a subscriber line using a notch filter in accordance with an embodiment of the present invention.

FIG. 9 is a flow chart for illustrating the speed control method of a subscriber line using a notch filter in accordance with an embodiment of the present invention.

Referring to FIG. 9, in the setting-up step of the target bandwidth (TB) for each subscriber, the terminal at the subscriber side is set up to the contracted bandwidth according to the service level agreement (SLA) provided by the service provider (S401).

In the line parameter monitoring step for each subscriber, the subscriber line performance is analyzed by observing the actual line parameter such as line rate, frequency characteristics, interference, packet error or etc. (S402).

In the comparing step of the actual subscriber line rate (AR) and the target bandwidth, the line performance analyzed in the line parameter monitoring step for each subscriber and the target bandwidth of the subscriber are compared (S403).

If the actual line rate is higher than the target bandwidth, a specific frequency notch filter processing step is performed (S404).

If the actual line rate is lower than the target bandwidth, a specific frequency notch filter processing step is disabled (S405).

Applying a notch filter processing to the frequency band having high SNR values, i.e. relatively stable frequency band lowers the actual line rate so as to meet the target bandwidth.

The line rate control method in the present invention can be used to provide other subscribers with more network resources by applying a notch filter processing to relatively stable frequency band and thus releasing resources having high quality or less noise; and no interference occurs since network resources having less noise are used when using the resources of other subscribers.

FIG. 10 is a diagram for illustrating the line condition in upload traffic before and after applying the line rate control method in accordance with an embodiment of the present invention.

As shown in FIG. 10, if the transmission power of the terminal (GNT) 200 is fixed, the transmission state of upload traffic can happen to be poor depending on the line condition, and in case of poor transmission state the transmission state can be improved by increasing the transmission power and SNR offset of the terminal (GNT) 200.

FIG. 11 is a diagram for illustrating the line condition in download traffic before and after applying the line rate control method in accordance with an embodiment of the present invention.

As shown in FIG. 11, if the transmission power of the G.hn access multiplexer (GAM) 100 is fixed, the transmission state of download traffic can happen to be poor depending on the line condition, and in case of poor transmission state the transmission state can be improved by increasing the transmission power and SNR offset of the G.hn access multiplexer (GAM) 100.

According to the present invention as described before, the G.hn technology can be applied to the access network using the conventional copper cable or phone line so as to provide efficient data transmission with higher bandwidth to service subscribers, to provide service level agreement (SLA) by setting up the bandwidth for each port and controlling transmission speed, and to reduce crosstalk in data transmission.

The present invention has been described with reference to an embodiment shown in the figures, which is an exemplification only and the various and equivalent embodiments are made possible by those who have ordinary knowledge in the area the present invention belongs to. Therefore, the technical scope of the present invention will be determined by the claims as follows.

What is claimed is:

1. An access multiplexer, comprising:
a plurality of domain masters as a collection of nodes, configured to communicate with an end-point of an access network;
a switch connected to the plurality of the domain masters; and
a controller configured to control at least one of the plurality of domain masters so that at least one of a bandwidth, an output power, and a signal to noise ratio offset of a signal transmitted by the at least one of the plurality of domain masters is controlled,
wherein the controller is connected to the at least one of the plurality of domain masters, and
wherein the controller is further configured to:
calculate an actual speed of the signal based on a line parameter including frequency characteristics, interference, or packet error,
apply notch filtering to the signal, if the acutal speed of the signal is higher than a target bandwidth a subscriber sets up, so that the bandwidth of the signal is reduced, and
increase at least one of the output power and the signal to noise ratio offset of the signal, if an actual received signal gain of a subscriber is larger than a preset target received signal gain of the subscriber, or if a preset target forward error correction rate of a subscriber is larger than an actual forward error correction rate of the subscriber, or if actual traffic for a corresponding subscriber is significantly larger to a predetermined amount than that of other subscribers.

2. An access network, comprising:
a plurality of domain masters in an access multiplexer communicating with an access network terminal via bundle cables: and
a controller, in the access multiplexer, configured to control the domain master so that the domain master controls at least one of a bandwidth, an actual traffic volume, an output power and a signal to noise ratio offset of a signal that the domain master transmits to the access network terminal via the bundle cables,
wherein the controller is connected to the at least one of the plurality of domain masters,
wherein the controller is further configured to calculate an actual speed of the signal based on a line parameter including frequency characteristics, interference, or packet error,
wherein the controller is further configured to reduce the bandwidth by applying a notch filter to the signal the domain master transmits, if the actual speed of a subscriber is higher than target bandwidth the subscriber sets up, or if actual traffic volume for the subscribers is low or significantly less to a predetermined amount than that of other subscribers, and
wherein the controller is further configured to increase at least one of the output power and the signal to noise ratio offset of the signal the dormain master transmits, if an actual received signal gain of a subscriber is larger than a preset target received signal gain of the subscriber, if a preset target forward error correction rate of a subscriber is larger than an actual forward error correction rate of the subscriber, or if actual traffic for a corresponding subscriber is significantly larger to a predetermined amount than that of other subscribers.

3. A line control method of an access network comprises:
in a controller of an access multiplexer, receiving a target bandwidth of a terminal which a subscriber sets up;
in a domain master of the access multiplexer, detecting a line parameter for the terminal, the line parameter including line rate, frequency characterisitcs, interference, or packet error;
in the controller, controlling the domain master to control a signal transmitted by the domain master based on the line, parameter;
in a terminal, detecting an actual received signal gain and a target forward error correction rate of the signal;
wherein the controller is configured to control at least one of an output power and a signal to noise ratio offset of the signal based on the actual received signal gain and the target forward error correction rate,
wherein the controller is configured to calculate an actual speed of the signal based on the line parameter,
wherein the controller is configured to reduce a bandwidth of the signal transmitted by the domain master by applying a notch filter to the signal, if the actual speed of a subscriber is higher than the target bandwidth that the subscriber sets up, or if an actual traffic volume for the subscriber does not exist or is larger than that of other subscribers, and
wherein the controller is further configured to increase at least one of the output power and the signal to noise ratio offset of the signal that the domain master transmits, if the actual received signal gain is larger than a preset target signal gain of the subscriber, if a preset target forward error correction rate of the subscriber is larger than an actual forward error correction rate of the subscriber, or if an actual traffic for the subscriber is larger than that of other subscribers.

4. The line control method of claim 3,
wherein the access network employs the G.hn technology and comprises more than one access multiplexer having a plurality of ports and a plurality of subscriber terminals, the line control method further comprises:
setting up the target bandwidth of at least one of the plurality of subscriber terminals;
monitoring the line parameter of a signal line physically connecting the more than one access multiplexer to the plurality of subscriber terminals;

comparing a computed bandwidth based on the line parameter with the target bandwidth; and adjusting, when the actual speed of the terminal is higher than the target bandwidth, the actual speed of the at least one of the plurality of subscriber terminals according to the target bandwidth, wherein the adjusting of the actual speed is performed by a specific frequency notch filtering.

5. The line control method of claim 4, wherein the access network is a telephone line based DSL access network.

6. The line control method of claim 4, wherein the plurality of ports are replaced with the domain master and the plurality of subscriber terminals are replaced with an end-point.

* * * * *